US 11,192,511 B2

(12) United States Patent
Nakajima et al.

(10) Patent No.: US 11,192,511 B2
(45) Date of Patent: Dec. 7, 2021

(54) DETERMINATION DEVICE, DETERMINATION SYSTEM, AND DETERMINATION METHOD

(71) Applicant: HONDA MOTOR CO., LTD., Tokyo (JP)

(72) Inventors: Kei Nakajima, Tokyo (JP); Kichinosuke Fukuhara, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 178 days.

(21) Appl. No.: 16/292,890

(22) Filed: Mar. 5, 2019

(65) Prior Publication Data
US 2019/0275972 A1   Sep. 12, 2019

(30) Foreign Application Priority Data

Mar. 7, 2018  (JP) .............................. JP2018-040904

(51) Int. Cl.
*H04W 4/44* (2018.01)
*H04W 4/80* (2018.01)
*B60R 21/015* (2006.01)

(52) U.S. Cl.
CPC .......... *B60R 21/01512* (2014.10); *H04W 4/44* (2018.02); *H04W 4/80* (2018.02)

(58) Field of Classification Search
CPC .... B60R 21/01512; H04W 4/44; H04W 4/80; H04W 4/029; H04W 4/40; H04L 67/22; H04L 67/12
See application file for complete search history.

(56) References Cited

U.S. PATENT DOCUMENTS

2016/0350567 A1* 12/2016 McQuade ........ G06K 19/06028
2019/0064806 A1*  2/2019 Nix ....................... B60W 50/00

FOREIGN PATENT DOCUMENTS

CN   104317789 A   1/2015
CN   106557942 A   4/2017
(Continued)

OTHER PUBLICATIONS

Rajabi et al., ("RFID for Cargo and Passenger Automation and Control in Airline Industry", Nov. 5, 2012, IJSCE, pp. 5-7 (Year: 2012).*
(Continued)

*Primary Examiner* — Peter D Nolan
*Assistant Examiner* — Ashley L Redhead, Jr.
(74) *Attorney, Agent, or Firm* — Carrier Blackman & Associates, P.C.; Joseph P. Carrier; Jeffrey T. Gedeon

(57) ABSTRACT

Determination related to an occupant of a moving body is performed in more detail. A determination device includes: a first acquisition unit that acquires facility-side access information that includes specific information of each terminal that accesses a network in a facility; a second acquisition unit that acquires moving body-side access information that includes specific information of each terminal that accesses a network in a moving body; and a determination unit that compares the specific information included in the facility-side access information, and the specific information included in the moving body-side access information to determine whether or not a plurality of the terminals which access the network in the moving body are terminals having a predetermined correlation.

7 Claims, 8 Drawing Sheets

(56) References Cited

FOREIGN PATENT DOCUMENTS

JP       H07-239958 A    9/1995
JP       2010-280354 A   12/2010

OTHER PUBLICATIONS

Sagahyroon et al., "Assessing the Feasibility of Using RFID Technology in Airports", Sep. 6, 2007 IEEE (Year: 2007).*
Office Action issued in the corresponding Chinese Patent Application No. 201910161135.9 dated May 27, 2021.

* cited by examiner

FIG. 6A

FACILITY-SIDE ACCESS INFORMATION DATABASE

| FACILITY DEVICE IDENTIFICATION INFORMATION | TERMINAL IDENTIFICATION INFORMATION | ACCESS INITIATION TIME | ACCESS TERMINATION TIME |
|---|---|---|---|
| $a^{th}$ FACILITY | $a^{th}$ TERMINAL | ... | ... |
| $a^{th}$ FACILITY | $b^{th}$ TERMINAL | ... | ... |
| ⋮ | ⋮ | ⋮ | ⋮ |
| $a^{th}$ FACILITY | $a^{th}$ TERMINAL | ... | ... |
| $b^{th}$ FACILITY | $c^{th}$ TERMINAL | ... | ... |
| ⋮ | ⋮ | ⋮ | ⋮ |
| $z^{th}$ FACILITY | $x^{th}$ TERMINAL | ... | ... |

FIG. 6B

VEHICLE-SIDE ACCESS INFORMATION DATABASE

| IN-VEHICLE DEVICE IDENTIFICATION INFORMATION | TERMINAL IDENTIFICATION INFORMATION | ACCESS INITIATION TIME | ACCESS TERMINATION TIME | VISIT FACILITY IDENTIFICATION INFORMATION |
|---|---|---|---|---|
| $a^{th}$ VEHICLE | $a^{th}$ TERMINAL | ... | ... | FIRST FACILITY |
| $a^{th}$ VEHICLE | $b^{th}$ TERMINAL | ... | ... | FIRST FACILITY |
| $b^{th}$ VEHICLE | $e^{th}$ TERMINAL | ⋮ | ⋮ | SECOND FACILITY |
| $b^{th}$ VEHICLE | $f^{th}$ TERMINAL | ... | ... | SECOND FACILITY |
| $c^{th}$ VEHICLE | $g^{th}$ TERMINAL | ... | ... | THIRD FACILITY |
| ⋮ | ⋮ | ⋮ | ⋮ | ⋮ |
| $z^{th}$ VEHICLE | $x^{th}$ TERMINAL | ... | ... | Nth FACILITY |

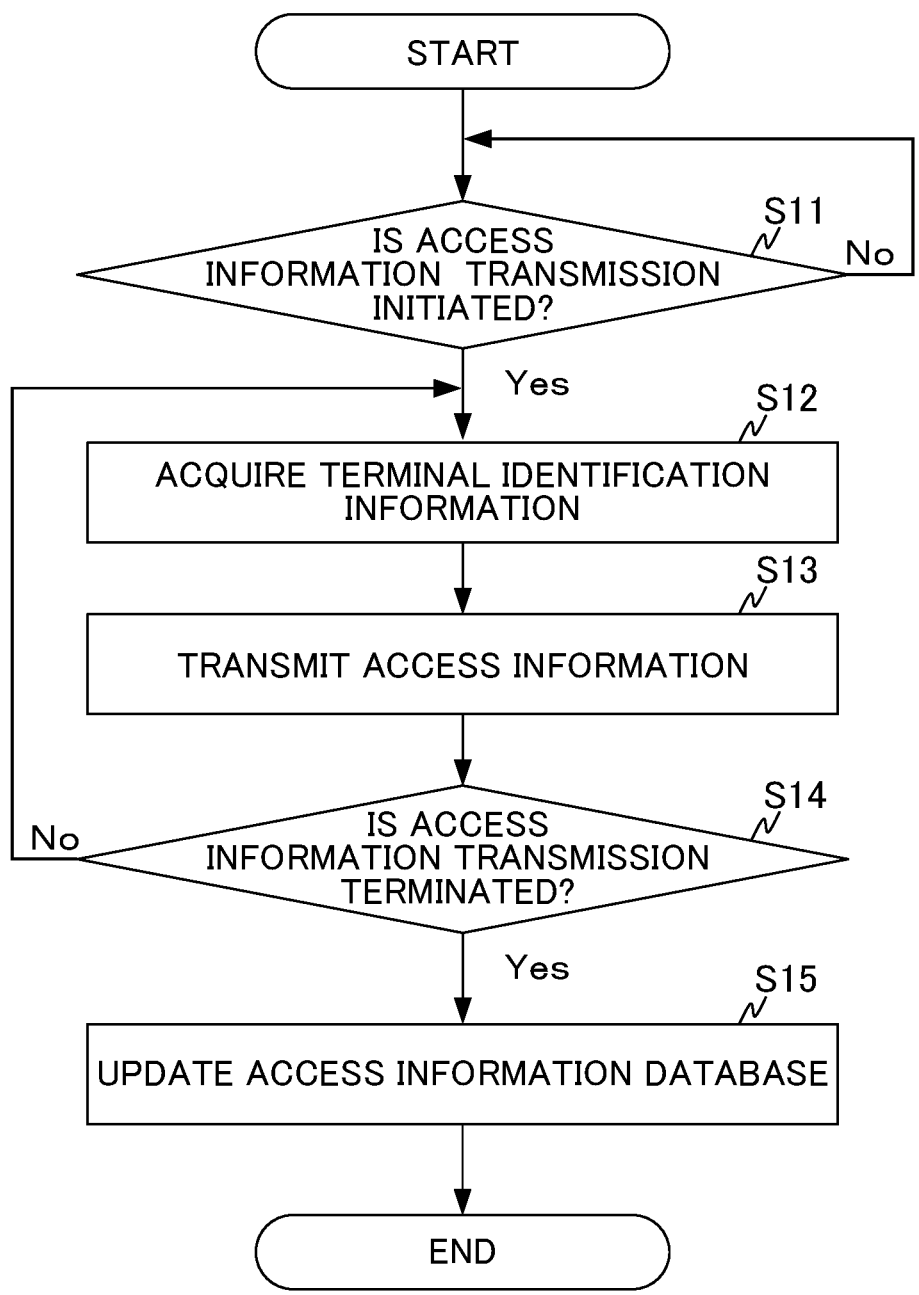

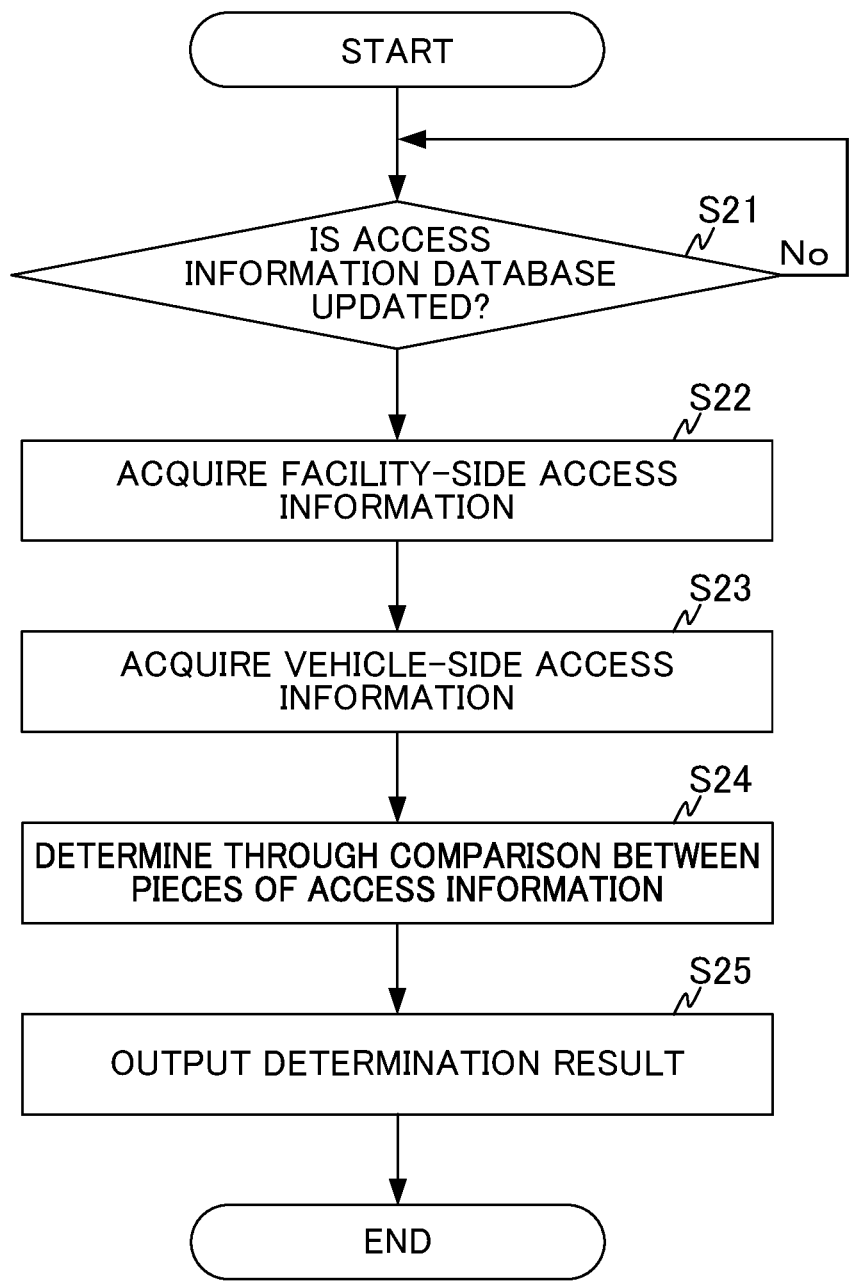

DETERMINATION DEVICE, DETERMINATION SYSTEM, AND DETERMINATION METHOD

This application is based on and claims the benefit of priority from Japanese Patent Application No. 2018-040904, filed on 7 Mar. 2018, the content of which is incorporated herein by reference.

BACKGROUND OF THE INVENTION

Field of the Invention

The present invention relates to a determination device, a determination system, and a determination method in which determination related to occupants of a moving body is performed.

Related Art

In the related art, a technology of performing determination related to occupants of a moving body such as an automobile is known. A determination result related to the occupants of the moving body can be used, for example, in a use such as marketing for a facility which the moving body visits. An example of the technology for the determination related to the occupant of the moving body is disclosed in Patent Document 1 and Patent Document 2.

Specifically, in a technology disclosed in Patent Document 1, a sensor that detects an occupant is provided in a getting-on/off port of the occupant in a vehicle, and the number of occupants is counted by the sensor. When using the technology disclosed in Patent Document 1, for example, in a passenger bus, it is possible to confirm the number of passengers who get on the bus and the number of passengers who get off the bus. In addition, in a technology disclosed in Patent Document 2, a sensor that detects an attachment/detachment state of a safety belt is provided, and the number of occupants is counted by the sensor. When using the technology disclosed in Patent Document 2, for example, it is possible to confirm whether or not an occupant sits on a seat for every vehicle seat.

Patent Document 1: Japanese Unexamined Patent Application, Publication No. H07-239958

Patent Document 2: Japanese Unexamined Patent Application, Publication No. 2010-280354

SUMMARY OF THE INVENTION

It is possible to determine the number of occupants of a moving body through determination using the technologies disclosed in Patent Documents, and the like. In this case, it is preferable to make a more detailed determination in addition to the simple determination of the number of occupants. For example, it is preferable to make a determination with regard to a correlation of occupants.

The invention has been made in consideration such circumstances, and an object thereof is to provide a determination device, a determination system, and a determination method which are capable of performing determination related to occupants of a moving body in more detail.

(1) According to an aspect of the invention, there is provided a determination device (for example, a determination device 40 to be described later) including: a first acquisition unit (for example, an access information accumulation unit 411 to be described later) that acquires facility-side access information that includes specific information (for example, terminal identification information 321 to be described later) of each terminal (for example, a terminal 30 to be described later) that accesses a network in a facility (for example, a facility 1 to be described later); a second acquisition unit (for example, the access information accumulation unit 411 to be described later) that acquires moving body-side access information that includes specific information of each terminal that accesses a network in a moving body (for example, a vehicle 2 to be described later); and a determination unit (for example, an occupant determination unit 412 to be described later) that compares the specific information included in the facility-side access information, and the specific information included in the moving body-side access information to determine whether or not a plurality of the terminals which access the network in the moving body are terminals having a predetermined correlation.

According to (1), it is possible to obtain a determination result as to whether or not terminals have a predetermined correlation on the basis of collected specific information of the terminals. That is, according to the determination device of the invention, it is possible to perform determination related to the occupants of the moving body in more detail. For example, it is possible to perform estimation related to an attribute of users who use terminals in the moving body, and the like.

(2) In the determination device according to (1), in a case where a plurality of pieces of the specific information which are included in the facility-side access information and relate to a plurality of the terminals, and a plurality of pieces of the specific information which are included in the moving body-side access information and relate to a plurality of the terminals are the same as each other, the determination unit may determine that the terminals are terminals having the predetermined correlation.

According to (2), it is possible to make a determination in consideration of a communication history in the facility on the basis of a clear standard as to whether or not the plurality of pieces of specific information which are collected are the same as each other.

(3) In the determination device according to (1) or (2), the determination unit may specify the number of times of access to the network in the facility by each of the terminals on the basis of the facility-side access information, and may make the determination on the basis of the number of times of access.

According to (3), the determination is made also on the basis of the number of times of access to the network, and thus it is possible to make the determination with more accuracy. For example, terminals of which the number of times of access to the network is great can be determined as terminals having a higher correlation.

(4) In the determination device according to any one of (1) to (3), the determination unit may specify an accumulated time of access to the network in the facility by each of the terminals on the basis of the facility-side access information, and may make the determination also on the basis of the accumulated time of access.

According to (4), the determination is performed also on the basis of the accumulated time of access to the network, and thus it is possible to perform the determination with more accuracy. For example, terminals of which an accumulated time of access to the network is long can be determined as terminals having a higher correlation.

(5) In the determination device according to any one of (1) to (4), the determination unit may specify an access time to the network in the facility by each of the terminals on the basis of the facility-side access information, and may perform the determination also on the basis of the access time.

According to (5), the determination is made also on the basis of the access time to the network, and thus it is possible to perform the determination with more accuracy. For example, the determination can be made by considering who is a user of a terminal on the basis of the access time to the network.

(6) In the determination device according to any one of (1) to (5), the facility may be a house in which a family resides, and in a case where the terminals which access the network in the moving body are terminals having a predetermined correlation, the determination unit may estimate that the family gets on the moving body.

According to (6), it is possible to estimate whether or not occupants who use terminals in the moving body are members of a family.

(7) According to another aspect of the invention, there is provided a determination system (for example, a getting-on attribute determination system S to be described later) including: the determination device according to any one of (1) to (6); and a facility device (for example, a facility device 10 to be described later). The facility device includes a relay unit (for example, a facility-side relay unit 111 to be described later) that relays communication by the terminal that accesses the network in the facility, and a transmission unit (for example, a facility-side access information transmission unit 112 to be described later) that generates the facility-side access information on the basis of the specific information of the terminal which is acquired in the relay, and transmits the generated facility-side access information to the determination device.

According to (7), it is possible to perform the determination by using the specific information of the terminal which is acquired when the relay device relays communication. For example, it is possible to perform the determination on the basis of the latest specific information for relaying communication.

(8) According to still another aspect of the invention, there is provided a determination method that is performed by a computer (for example, a determination device 40 to be described later). The method includes: a first acquisition step of acquiring facility-side access information that includes specific information (for example, terminal identification information 321 to be described later) of each terminal (for example, a terminal 30 to be described later) that accesses a network in a facility (for example, a facility 1 to be described later); a second acquisition step of acquiring moving body-side access information that includes specific information of each terminal that accesses a network in a moving body (for example, a vehicle 2 to be described later); and a determination step of comparing the specific information included in the facility-side access information, and the specific information included in the moving body-side access information to determine whether or not a plurality of the terminals which access the network in the moving body are terminals having a predetermined correlation.

According to the method in (8), it is possible to attain the same effect as in the determination device in (1).

According to the invention, it is possible to perform determination related to occupants of a moving body in more detail.

BRIEF DESCRIPTION OF THE DRAWINGS

FIG. 6A is a table showing an example of a facility-side access information database according to the embodiment of the invention.

FIG. 6B is a table showing an example of a vehicle-side access information database according to the embodiment of the invention.

FIG. 7 is a flowchart illustrating a basic operation in access information collection processing according to the embodiment of the invention.

FIG. 8 is a flowchart illustrating a basic operation in the access information determination processing according to the embodiment of the invention.

DETAILED DESCRIPTION OF THE INVENTION

Hereinafter, a preferred embodiment of the invention will be described in detail with reference to the accompanying drawings.

<Overall Configuration of Getting-On Attribute Determination System S>

Figure 1:
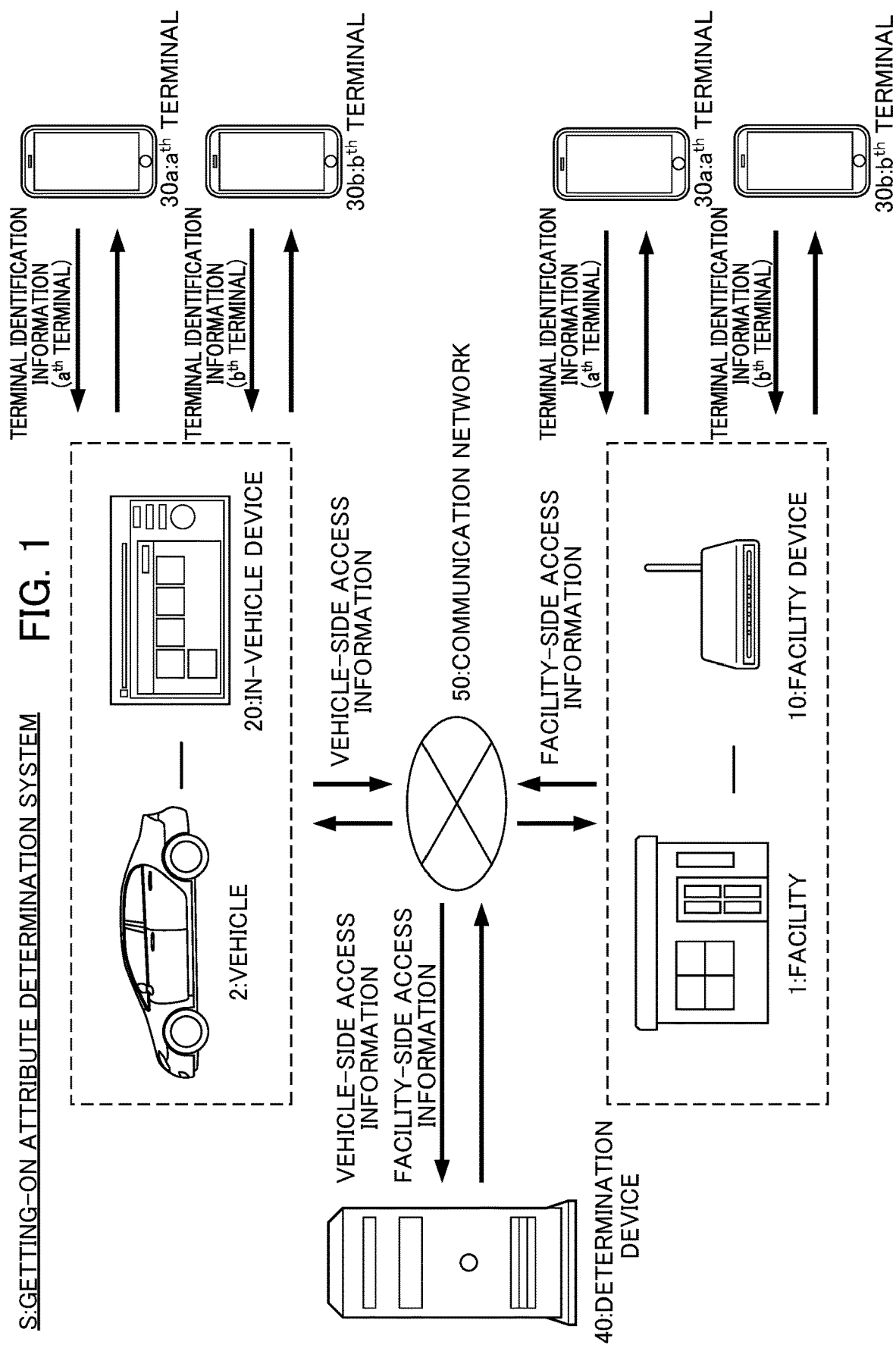
FIG. 1 is a block diagram illustrating a basic configuration of the entirety of getting-on attribute determination system according to an embodiment of the invention.

Description will be given of a getting-on attribute determination system S according to the preferred embodiment of the invention. FIG. 1 illustrates an overall configuration of the getting-on attribute determination system S.

As illustrated in FIG. 1, the getting-on attribute determination system S includes a facility device 10, an in-vehicle device 20, a terminal 30, and a determination device 40. The devices and the terminal are connected to each other in a communication possible manner through a communication network 50. In addition, the facility device 10 is used in a state of being installed in a facility 1. In addition, the in-vehicle device 20 is used in a state of being installed in a vehicle 2.

In the drawing, the facility device 10 (and the facility 1 corresponding thereto), the in-vehicle device 20 (the vehicle 2 corresponding thereto), and the determination device 40 are illustrated one by one. In addition, as the terminal 30, two terminals including an $a^{th}$ terminal 30a and a $b^{th}$ terminal 30b are illustrated in the drawing. However, the drawing is illustrative only, and the number of the devices and the number of the terminals which are included in the getting-on attribute determination system S may be an arbitrary number. Furthermore, in the following description, when not being discriminated, the $a^{th}$ terminal 30a and the $b^{th}$ terminal 30b are simply referred to as "terminal 30" while omitting an alphabet at the end.

In addition, in the drawing, as an example of information that is transmitted and received by the devices and the terminals, terminal identification information, vehicle-side access information, and facility-side access information are illustrated. However, a plurality of pieces of the information are illustrative only, and other pieces of information (not illustrated) may be transmitted and received in the getting-on attribute determination system S.

The facility device 10 functions as a relay device that realizes a local area network (LAN) in the facility 1. Here, for example, the facility 1 may be referred to as a point of interest (POI) such as a house in which a family resides, an office building in which company employees work, and a commercial facility. In the following description, description will be given on the assumption that the facility 1 the house in which the family resides as an example.

Terminals 30 which are respectively used by users as a family access the facility device 10 for communication. In addition, the terminals 30 access the communication network 50 by using the facility device 10 as a relay device, and perform communication with other devices (for example, other terminals 30, a server device that provides predetermined content, and the like) which are connected to the communication network 50. Furthermore, the other devices which become a communication destination, and the content of information that is transmitted and received to and from the other devices are not particularly limited, and illustration and detailed description thereof will be omitted.

In addition, when relaying communication, the facility device 10 acquires terminal identification information for identifying each of the terminals 30 from the terminal 30. The terminal identification information is specific information for every terminal 30. For example, a media access control (MAC) address that is allocated for every terminal 30 can be set as the terminal identification information. In the drawing, a case where the facility device 10 acquires identification information of the $a^{th}$ terminal 30a from the $a^{th}$ terminal 30a, and acquires identification information of the $b^{th}$ terminal 30b from the $b^{th}$ terminal 30b is illustrated.

The facility device 10 generates facility-side access information on the basis of the acquired terminal identification information of the terminal 30. In addition, the facility device 10 transmits the facility-side access information that is generated to the determination device 40 through the communication network 50. For example, the facility device 10 is realized by applying a facility-side access information generation function and a facility-side access information transmission function to a general-purpose relay device such as a router.

The in-vehicle device 20 functions as a relay device that realizes the LAN in the vehicle 2. Here, the vehicle 2 is realized by a moving body such as a four-wheeled vehicle and a motorcycle. Each of the terminals 30 which are used by users who get on the vehicle 2 accesses the in-vehicle device 20 for communication. In addition, as in access to the facility device 10, the terminal 30 accesses the communication network 50 by using the in-vehicle device 20 as a relay device, and performs communication with other devices (as described above, for example, other terminals 30, a server device that provides predetermined content, and the like) which are connected to the communication network 50.

In addition, as in the facility device 10, when relaying communication, the in-vehicle device 20 acquires terminal identification information for identifying each of the terminals 30 from the terminal 30. In the drawing, a case where the in-vehicle device 20 acquires identification information of the $a^{th}$ terminal 30a from the $a^{th}$ terminal 30a and acquires identification information of the $b^{th}$ terminal 30b from the $b^{th}$ terminal 30b is illustrated. The in-vehicle device 20 generates vehicle-side access information on the basis of the acquired terminal identification information of the terminal 30. In addition, the in-vehicle device 20 transmits the vehicle-side access information that is generated to the determination device 40 through the communication network 50.

In addition, the in-vehicle device 20 also has a function of performing route guidance (car navigation) with respect to a user who gets on the vehicle 2. The in-vehicle device 20 measures a current position of the in-vehicle device 20 (that is, a current position of the vehicle 2) for the route guidance. In addition, the in-vehicle device 20 sets a destination on the basis of a user's requirement, and performs the route guidance from the current position that is measured to the destination that is set. For example, the in-vehicle device 20 can be realized by a car navigation device that is mounted in the vehicle 2 that is a moving body, or a portable navigation device (PND) that is simply mounted in the vehicle 2 that is a moving body.

The terminal 30 is a portable terminal that is used by a user who resides in the facility 1, or other users. The terminal 30 realizes a predetermined function (for example, an application such as web browsing, voice communication, reproduction of image data or music data, and gaming) in accordance with a user's operation. In addition, with regard to the predetermined function, the terminal 30 performs communication with other devices (as described above, for example, other terminals 30, a server device that provides predetermined content, and the like) which are connected to the communication network 50. The communication is realized through access to the communication network 50 by using the facility device 10 or the in-vehicle device 20 as a relay device.

In addition, the terminal 30 stores the terminal identification information, and transmits the terminal identification information to the facility device 10 or the in-vehicle device 20 in communication. The terminal 30 can be realized by a smart phone, a portable telephone, a tablet-type terminal, a notebook computer, and other portable electronic devices.

The determination device 40 is a device that performs "access information collection processing" and "access information determination processing". Here, access information collection processing is a series of processing of collecting the facility-side access information from the facility device 10 and collecting the vehicle-side access information from the in-vehicle device 20. Each piece of the access information includes the terminal identification information of the terminal 30 of which communication access is established.

In addition, the access information determination processing is a series of processing of determining whether or not the terminals 30 of respective occupants who get on the vehicle 2 (that is, the occupants who use the terminals 30) have a predetermined correlation on the basis of each piece of the access information collected by the access information collection processing.

The determination device 40 can obtain a determination result as to whether or not the terminals 30 of respective occupants who get on the vehicle 2 (that is, the occupants who use the terminals 30) have a predetermined correlation through the processing. That is, according to this embodiment, it is possible to perform determination related to the occupants of the moving body in more detail. For example, it is possible to perform estimation related to an attribute between the users who use the terminals in the moving body, and the like.

In addition, the users of the determination device 40 can utilize the determination result by the determination device 40 in various uses. For example, the users of the determination device 40 can use a determination result that is obtained by the determination device 40 and relates to the number of occupants or the attribute of the occupants in a marketing consulting service that is performed with respect to commercial facilities such as a restaurant and a museum.

Furthermore, for example, the determination device 40 can be realized by combining software for realizing the function specific to this embodiment to a general-purpose server device.

The communication network 50 is realized by a network such as the Internet, a portable telephone network, and the LAN, or a network in combination of the networks. Furthermore, with regard to communication through the communication network 50 and communication that is performed between the facility device 10 and the in-vehicle device 20, and the terminals 30, a communication method is not particularly limited. For example, communication through the communication network 50 may conform to a communication standard such as IEEE 802.11, $3^{rd}$ generation (3G), long term evolution (LTE), and $4^{th}$ generation (4G). In addition, for example, communication that is performed between the facility device 10 and the in-vehicle device 20, and the terminals 30 may conform to a non-contact short-range communication standard based on a standard such as Wi-Fi (registered trademark), Bluetooth (registered trademark), and near field communication (NFC), or may conform to a wired short-range communication through a universal serial bus (USB) cable and the like.

<Functional Block Provided in Facility Device 10>

Next, a functional block that is provided in the facility device 10 will be described with reference to a block diagram in FIG. 2.

Figure 2:
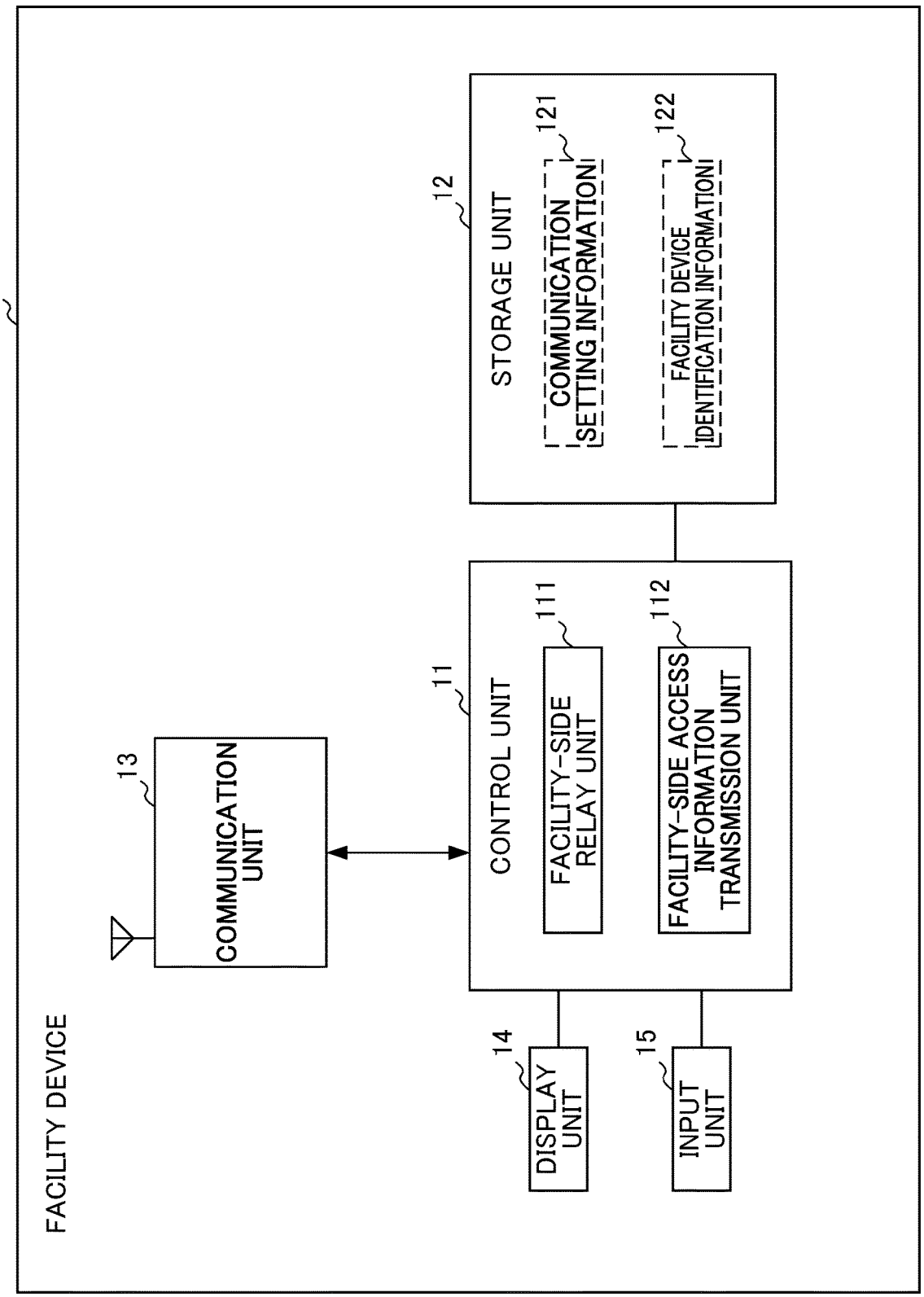
FIG. 2 is a functional block diagram illustrating a functional configuration of a facility device according to the embodiment of the invention.

As illustrated in FIG. 2, the facility device 10 includes a control unit 11, a storage unit 12, a communication unit 13, a display unit 14, and an input unit 15.

The control unit 11 is constituted by an operation processing device such as a microprocessor, and performs control of respective units which constitute the facility device 10. Details of the control unit 11 will be described later.

The storage unit 12 is constituted by a semiconductor memory, and stores a control program that is called firmware or the like, a program for performing communication relay, and a program for transmitting the facility-side access information to the determination device 40 in the access information collection processing by the determination device 40. In addition, the storage unit 12 stores various pieces of information which are set as a processing target of the programs. In the drawing, as information that is stored in the storage unit 12, communication setting information 121 and facility device identification information 122 as information that is particularly related to this embodiment are illustrated.

The communication setting information 121 is information that indicates setting in order for the facility device 10 to function as a communication relay device. For example, the communication setting information 121 includes setting of an ID or passwords for performing communication through a provider in the communication network 50. In addition, for example, the communication setting information 121 further includes setting of a service set identifier (SSID) for performing wireless communication with the terminal 30, an encryption key, or an encryption method.

The facility device identification information 122 is information for identifying the facility device 10. The facility device identification information 122 is information specific to every facility device 10. For example, as in the terminal identification information, a MAC address that is allocated for every facility device 10 may be set as the facility device identification information 122.

The respective pieces of information which are stored in the storage unit 12 may be stored in the storage unit 12 in advance, or may be appropriately downloaded from the determination device 40 that is connected to the communication network 50 or other server devices (not illustrated) as necessary. In addition, the respective pieces of information may be appropriately corrected in accordance with a user's input and the like.

The communication unit 13 includes a digital signal processor (DSP) and the like, and realizes communication between the terminals 30, or communication with the determination device 40 through the communication network 50. A communication method in the communication is not particularly limited as described above. For example, the communication unit 13 is used to relay communication by the terminals 30 by a facility-side relay unit 111 to be described later, or to transmit the facility-side access information to the determination device 40 by a facility-side access information transmission unit 112 to be described later.

The display unit 14 is constituted by a display device such as a liquid crystal display and an organic electroluminescence panel. The display unit 14 receives an instruction from the control unit 11 and displays predetermined information. For example, the display unit 14 displays content of the communication setting information 121 that is currently set, and the like to perform communication setting.

The input unit 15 is constituted by an input device such as a physical switch and a touch panel that is provided to overlap a display surface of the display unit 14. An operation by a user can be realized by outputting a signal based on an operation input from the input unit 15, for example, pressing of the physical switch by the user, and the like to the control unit 11. Furthermore, in the drawing, the display unit 14 and the input unit 15 are provided integrally with the facility device 10, but the display unit 14 and the input unit 15 may be realized by a display or an external device that is separated from the facility device 10. For example, the display unit 14 and the input unit 15 may be realized by a display or a personal computer that is connected to a LAN in the facility 1.

Next, details of the control unit 11 will be described. The control unit 11 is constituted by a microprocessor including a central processing unit (CPU), a random access memory (RAM), a read only memory (ROM), and an input/output (I/O), and the like. The CPU executes respective programs which are read out from the ROM or the storage unit 12, reads out information from the RAM, the ROM, and the storage unit 12 during the execution, performs writing of the information with respect to the RAM and the storage unit 12, and transmits and receives a signal to and from the communication unit 13, the display unit 14, and the input unit 15. In addition, when the hardware and the software (program) cooperate as described above, the processing in this embodiment is realized.

The control unit 11 includes the facility-side relay unit 111 and the facility-side access information transmission unit 112 as a functional block.

The facility-side relay unit 111 is a unit that performs relay processing for realizing the LAN in the facility 1. The facility-side relay unit 111 relays communication between the terminals 30 and other devices (for example, other terminals 30, a server device that provides predetermined content, and the like) which are connected to the communication network 50 in the facility 1 with the setting content based on the communication setting information 121. Furthermore, the relay processing for realizing the LAN is well known to those skilled in the art, and thus further detailed description will be omitted.

The facility-side access information transmission unit 112 generates facility-side access information on the basis of the terminal identification information that is acquired from the terminals 30 in the relay processing performed by the facility-side relay unit 111. In addition, the facility-side access information transmission unit 112 transmits the generated facility-side access information to the determination device 40. Generation and transmission of the facility-side access information may be performed whenever the terminals 30 access the facility device 10, or may be periodically performed at a predetermined cycle. The facility-side access information includes terminal identification information of each of the terminals 30 which access the facility device 10, an access time of the terminal 30, and the like. Details of the facility-side access information will be described later with reference to FIG. 6A.

<Functional Block Provided in In-Vehicle Device 20>

Next, a functional block that is provided in the in-vehicle device 20 will be described with reference to a block diagram of FIG. 3. Here, the facility device 10 is supplied with electric power, for example, from a household power supply in the facility 1. In contrast, the in-vehicle device 20 is supplied with electric power, for example, from a cigarette lighter socket of the vehicle 2.

Figure 3:
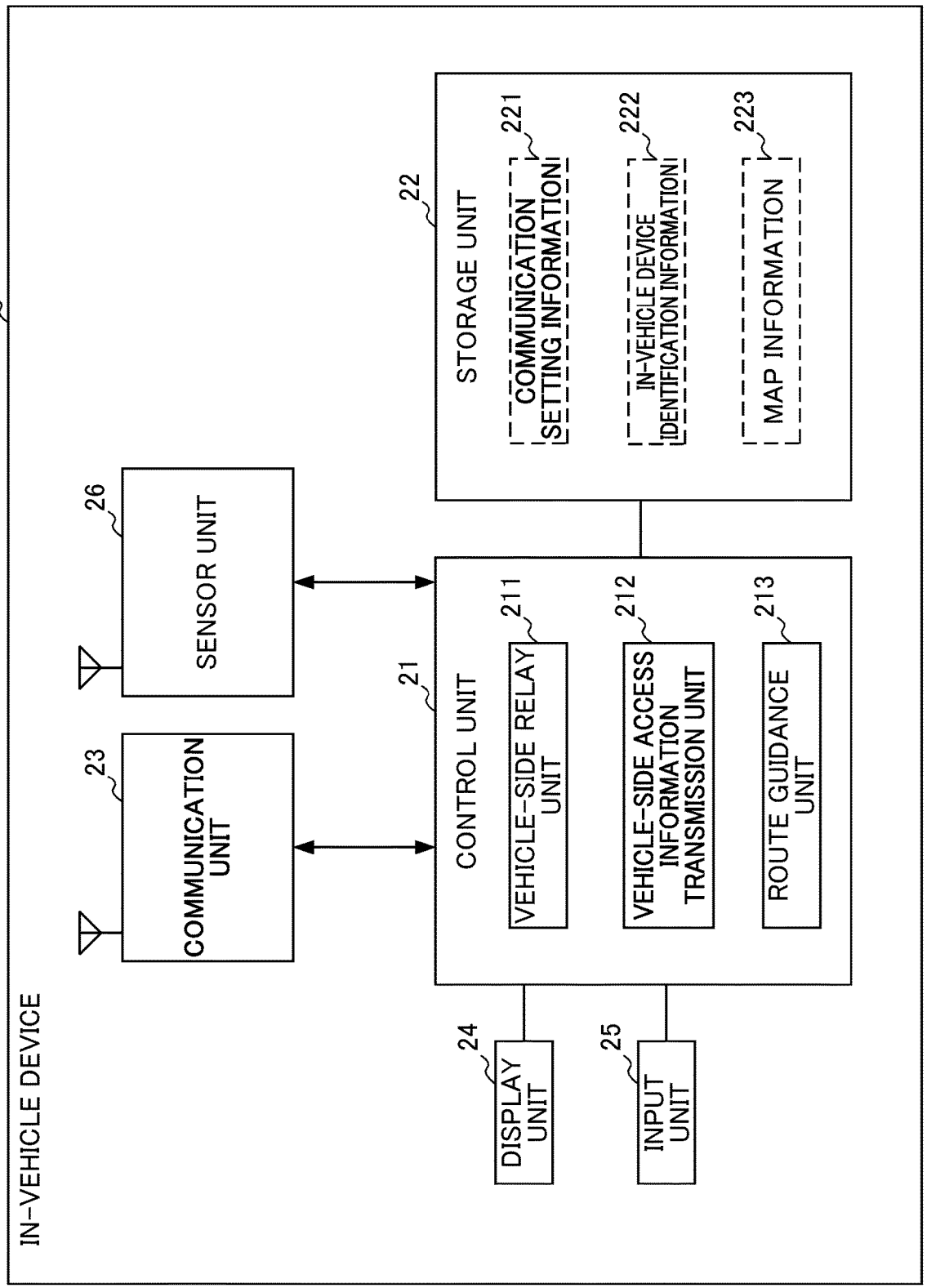
FIG. 3 is a functional block diagram illustrating a functional configuration of an in-vehicle device according to the embodiment of the invention.

As illustrated in FIG. 3, the in-vehicle device 20 includes a control unit 21, a storage unit 22, a communication unit 23, a display unit 24, an input unit 25, and a sensor unit 26. Here, the control unit 21, the storage unit 22, the communication unit 23, the display unit 24, the input unit 25, and the sensor unit 26 have the same hardware function as in the functional block with the same terminology in the facility device 10, and thus redundant description will be omitted.

However, the in-vehicle device 20 is different from the facility device 10 in that the sensor unit 26 is provided. In addition, information that is stored in the storage unit 22 of the in-vehicle device 20 and the information that is stored in the storage unit 12 of the facility device 10 are partially different from each other. In addition, a functional block provided in the control unit 21 of the in-vehicle device 20 and the functional block of the control unit 11 of the facility device 10 are partially different from each other. Hereinafter, a difference between the in-vehicle device 20 and the facility device 10 will be described in detail.

For example, the sensor unit 26 is constituted by a global positioning system (GPS) sensor, a gyro sensor, an acceleration sensor, or the like. The sensor unit 26 has a function as a position detection unit that detects position information. For example, the sensor unit 26 receives a signal that is output from a GPS satellite by a GPS sensor, and measures position information (latitude and longitude) of the in-vehicle device 20. Position measurement by the sensor unit 26 is performed at a predetermined time interval (for example, an interval of three seconds) as described above. The sensor unit 26 outputs the measured position information of the in-vehicle device 20 to the control unit 21. Here, the position information of the in-vehicle device 20 corresponds to position information of the vehicle 2 that is moving.

In addition, the sensor unit 26 measures an advancing direction of the in-vehicle device 20 (that is, an advancing direction of the vehicle 2) on the basis of a measurement result obtained by each sensor. Furthermore, the sensor unit 26 can further enhance measurement accuracy of the position information on the basis of an angular velocity or acceleration that is measured by the gyro sensor or the acceleration sensor. In addition, in a case where GPS communication is difficult or impossible, the sensor unit 26 can use assisted global positioning system (ALPS) communication and can calculate position information by base station information that is acquired from the communication unit 23.

As in the storage unit 12, the storage unit 22 is constituted by a semiconductor memory or the like, and stores a control program that is called firmware or the like, a program for performing communication relay, a program for performing route guidance, and a program for transmitting the vehicle-side access information to the determination device 40 during the access information collection processing by the determination device 40. In addition, the storage unit 22 stores various pieces of information which are set as a processing target of the programs. In the drawing, as information that is stored in the storage unit 22, communication setting information 221, in-vehicle device identification information 222, and map information 223 as information that is particularly related to this embodiment are illustrated.

The communication setting information 221 is the same information as the communication setting information 121 of the facility device 10, and is information indicating setting in order for the in-vehicle device 20 to function as a communication relay device. The in-vehicle device identification information 222 is the same information as the facility device identification information 122 of the facility device 10, and is information for identifying the in-vehicle device 20. For example, as in the terminal identification information or the facility device identification information 122, a MAC address that is allocated for every in-vehicle device 20 may be set as the in-vehicle device identification information 222.

The map information 223 includes information such as information related to a feature of a road, a facility, and the like, road information, facility access information, and parking lot information. In addition, the map information 223 also includes road network data and the like which include display map data for displaying a background such as a road and a road map, access information of a node (for example, an intersection point, a curved point, an end point, and the like of a road) and type information thereof, access information of a link that is a route connecting respective nodes and type information thereof, link cost data related to cost information (for example, a distance, a required time, and the like) of all links, and the like.

As the road information, so-called road map information such as a road type and a traffic signal is stored. As the facility access information, access information of each facility is stored as information of latitude and longitude. In addition, as the facility access information, accessory information such as facility identification information (a facility ID), a name, a facility type (and/or kind), a telephone number, an address, a business time, a menu that is serviced in a case where the facility is a restaurant, and facility information related to a product service may be included. As the parking lot information, parking lot access information is stored as information of latitude and longitude. In a case where the parking lot is a parking lot of each facility, the facility and the parking lot are stored in association with each other.

The control unit 21 includes a vehicle-side relay unit 211, a vehicle-side access information transmission unit 212, and a route guidance unit 213 as a functional block.

The vehicle-side relay unit 211 is a unit that performs relay processing for realizing the LAN in the vehicle 2. A function of the vehicle-side relay unit 211 is the same as in the facility-side relay unit 111, and thus redundant description thereof will be omitted. A function of the vehicle-side access information transmission unit 212 is also the same as in the facility-side access information transmission unit 112. That is, in relay processing that is performed by the vehicle-side relay unit 211, the vehicle-side access information transmission unit 212 generates vehicle-side access information on the basis of terminal identification information that is acquired form the terminal 30. In addition, the vehicle-side access information transmission unit 212 transmits the generated vehicle-side access information to the determination device 40. Generation and transmission of the vehicle-side access information may be performed whenever the terminals 30 access the in-vehicle device 20, or may be periodically performed at a predetermined cycle.

The vehicle-side access information includes terminal identification information of each of the terminals 30 which access the in-vehicle device 20, an access time of the terminal 30, and the like. Details of the vehicle-side access information will be described later with reference to FIG. 6B. Furthermore, in addition to the information that is included in the facility-side access information, the vehicle-side access information may include facility identification information for identifying a facility which the vehicle 2 visits. In this case, for example, the vehicle-side access information transmission unit 212 compares a position (a stopped position of the vehicle 2) that is measured by the sensor unit 26, and the map information 223 with each other immediately before an ignition switch of the vehicle 2 is turned off (engine stopping). According to this, the vehicle-side access information transmission unit 212 may specify facility identification information for identifying a facility which the vehicle 2 visits. Alternatively, for example, the vehicle-side access information transmission unit 212 compares a facility that is designated as a destination in route guidance by the route guidance unit 213 to be described later, and the map information 223 with each other. According to this, the vehicle-side access information transmission unit 212 can also specify facility identification information for identifying a facility which the vehicle 2 visits.

The route guidance unit 213 is a unit that performs route guidance processing to a destination such as a facility that is input or selected by a user who gets on the vehicle 2. The route guidance processing to the destination is the same as route guidance processing in a typical car navigation system. That is, the route guidance unit 213 generates a map up to a destination on the basis of the map information 223 stored in the storage unit 22, overlaps a current position of the in-vehicle device 20 which is measured by the sensor unit 26, a position of the destination, and a guidance route that is route information to the destination on the map, and displays the resultant overlap on the display unit 24 to perform route guidance. In addition, in a case where the current position of the in-vehicle device 20 deviates from the guidance route, the route guidance unit 213 resets (reroutes) the guidance route from the deviation site to the destination, and displays the reset guidance route on the display unit 24 to perform the route guidance.

In addition, in this case, a sound for route guidance may be output from a speaker (not illustrated). In addition, road congestion situation information, weather information, and the like may be acquired through communication by the communication unit 23, and the acquired information may be used in the route guidance processing. For example, a road situation (for example, a congestion situation or the like) acquired from a Vehicle Information Communication System (VICS) registered trademark) through the communication unit 23 may be used in the route guidance processing. Furthermore, the route guidance processing up to the destination is well known to those skilled in the art, and thus further detailed description will be omitted.

<Functional Block Provided in Terminal 30>

Next, description will be given of a functional block that is provided in the terminal 30 with reference to a block diagram of FIG. 4. For example, the terminal 30 is supplied with electric power from a battery (not illustrated) that is embedded in the terminal 30.

Figure 4:
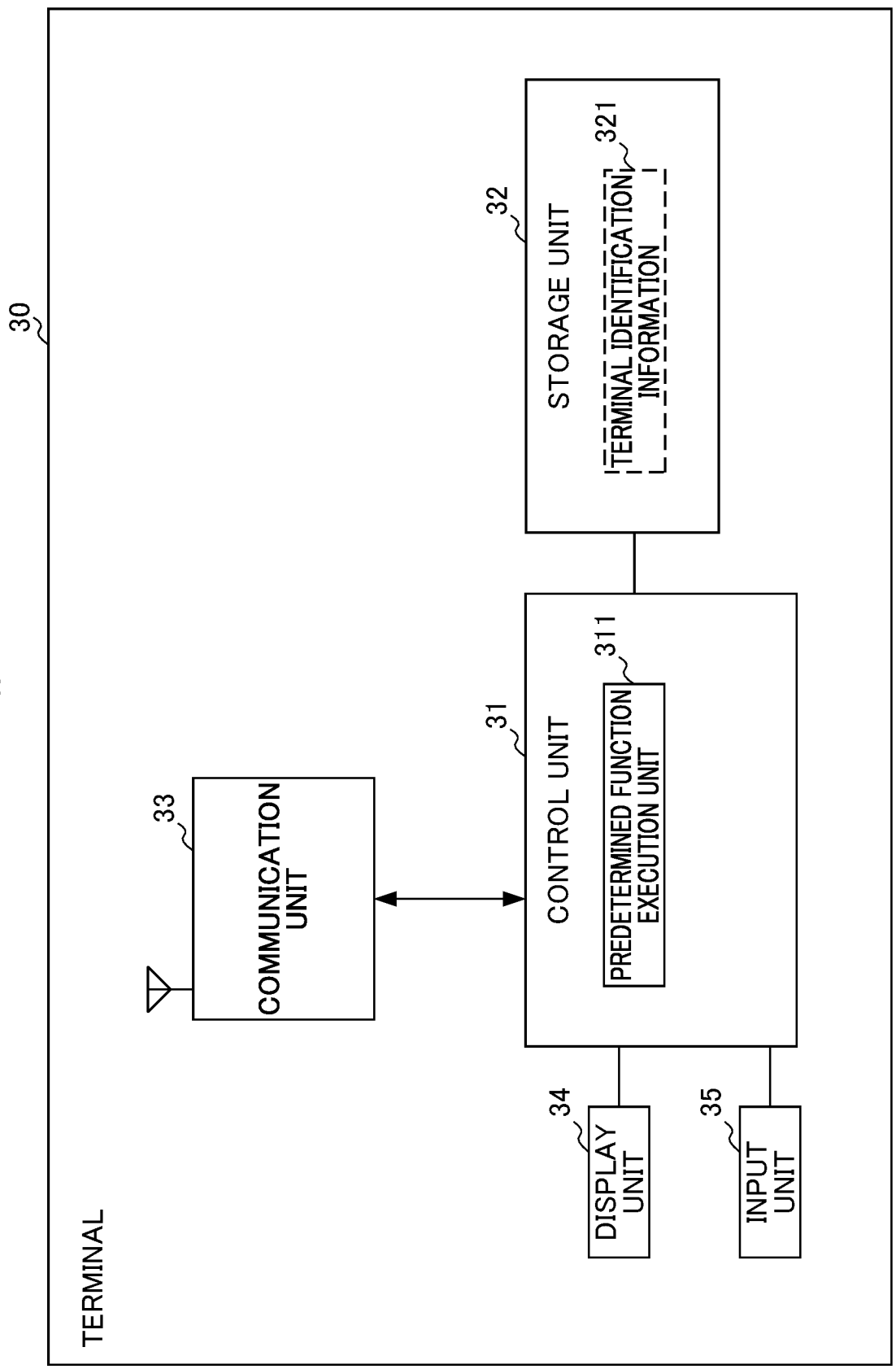
FIG. 4 is a functional block diagram illustrating a functional configuration of a portable terminal according to the embodiment of the invention.
Figure 5:
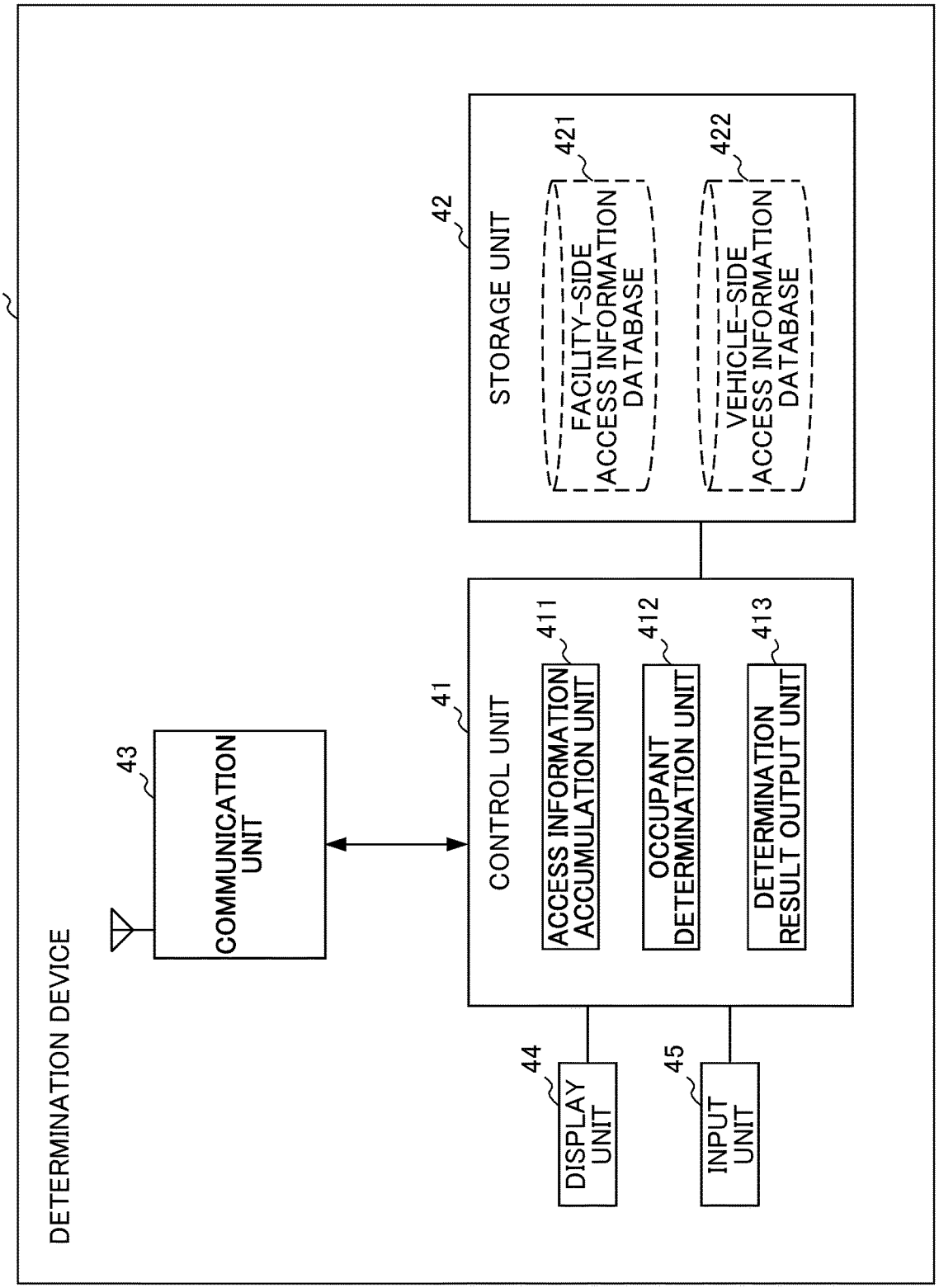
FIG. 5 is a functional block diagram illustrating a functional configuration of a determination device according to an embodiment of the invention.

As illustrated in FIG. 4, the terminal 30 includes a control unit 31, a storage unit 32, a communication unit 33, a display unit 34, and an input unit 35. Here, the control unit 31, the storage unit 32, the communication unit 33, the display unit 34, and the input unit 35 have the same hardware function as in the functional block with the same terminology in the facility device 10 or the in-vehicle device 20, and thus redundant description will be omitted.

However, information that is stored in the storage unit 32 of the terminal 30, and information that is stored in the storage unit 12 of the facility device 10 or the storage unit 22 of the in-vehicle device 20 are different from each other. In addition, a functional block that is provided in the control unit 31 of the terminal 30, and the functional block of the control unit 11 of the facility device 10 or the control unit 21 of the in-vehicle device 20 are different from each other. Hereinafter, a difference between the terminal 30, and the facility device 10 and the in-vehicle device 20 will be described in detail.

As in the storage unit 12, the storage unit 32 is constituted by a semiconductor memory or the like, and stores a control program called firmware or the like, and a program for executing a predetermined function. In addition, the storage unit 32 stores various pieces of information which are set as a processing target of the programs. In the drawing, as information that is stored in the storage unit 32, terminal identification information 321 as information that is particularly related to this embodiment is illustrated. The terminal identification information 321 is the same information as the facility device identification information 122 of the facility device 10 or the in-vehicle device identification information 222 of the in-vehicle device 20, and is information for identifying the terminal 30. For example, as in the facility device identification information 122 and the in-vehicle device identification information 222, a MAC address that is allocated for every terminal 30 can be set as the terminal identification information 321.

The control unit 31 includes a predetermined function execution unit 311 as a functional block. The predetermined function execution unit 311 is a unit that executes a predetermined function. Here, for example, the predetermined function is a function of an application such as web browsing, voice communication, reproduction of image data or music data, and gaming as described above. Here, communication necessary to execute the predetermined function is performed by communication access of the facility device 10, the in-vehicle device 20, and the like with a relay device.

<Functional Block Provided in Determination Device 40>

Next, description will be given of a functional block that is provided in the determination device 40 with reference to a block diagram of FIG. 4.

As illustrated in FIG. 4, the determination device 40 includes a control unit 41, a storage unit 42, a communication unit 43, a display unit 44, and an input unit 45. Here, the control unit 41, the storage unit 42, the communication unit 43, the display unit 44, and the input unit 45 have the same hardware function as in the functional block with the same terminology in the facility device 10 or the in-vehicle device 20, and thus redundant description will be omitted.

However, information that is stored in the storage unit 42 of the determination device 40, and information that is stored in the storage unit 12 of the facility device 10, the storage unit 22 of the in-vehicle device 20, or the storage unit 32 of the terminal 30 are different from each other. In addition, a functional block that is provided in the control unit 41 of the determination device 40, and the functional block of the control unit 11 of the facility device 10, the control unit 21 of the in-vehicle device 20, or the control unit 31 of the terminal 30 are different from each other. Hereinafter, a difference between the determination device 40, and the facility device 10, the in-vehicle device 20, and the terminal 30 will be described in detail.

As in the storage unit 12, the storage unit 42 is constituted by a semiconductor memory or the like, and stores a control program called firmware or the like, a program for executing access information collection processing, and a program for executing access information determination processing. In addition, the storage unit 42 stores various pieces of information which are set as a processing target of the programs. In the drawing, as information that is stored in the storage unit 42, a facility-side access information database 421 and a vehicle-side access information database 422 as information that is particularly related to this embodiment are illustrated.

The facility-side access information database 421 is a database in which the facility-side access information received from the facility device 10 in the access information collection processing is accumulated. The facility-side access information that is accumulated in the facility-side access information database 421 will be described with reference to FIG. 6A. The vehicle-side access information database 422 is a database in which the vehicle-side access information received from the in-vehicle device 20 in the access information collection processing is accumulated. The vehicle-side access information that is accumulated in the vehicle-side access information database 422 will be described later with reference to FIG. 6B.

The control unit 41 includes an access information accumulation unit 411, an occupant determination unit 412, and a determination result output unit 413 as a functional block. The access information accumulation unit 411 is a unit that stores and accumulates information in the databases stored in the storage unit 42 to update the respective databases. Specifically, the access information accumulation unit 411 accumulates the facility-side access information received from the facility device 10 in the access information collection processing in the facility-side access information database 421. In addition, the access information accumulation unit 411 accumulates the vehicle-side access information received form the in-vehicle device 20 in the access information collection processing in the vehicle-side access information database 422.

In the access information determination processing, the occupant determination unit 412 compares the facility-side access information accumulated in the facility-side access information database 421 and the vehicle-side access information accumulated in the vehicle-side access information database 422 to determine whether or not the terminals 30 of occupants who get on the vehicle 2 (that is, the occupants who use the terminals 30) have a predetermined correlation. In addition, the occupant determination unit 412 outputs the determination result to the determination result output unit 413. A determination method of the occupant determination unit 412 will be described with reference to FIG. 6A and FIG. 6B after describing the facility-side access information database 421 and the vehicle-side access information database 422.

The determination result output unit 413 is a unit that outputs a determination result that is input from the occupant determination unit 412. For example, an output by the determination result output unit 413 is performed through display on a display included in the display unit 44. In addition, in addition to this, the output by the determination result output unit 413 may be performed through accumulation of the determination result in the storage unit 42 or the like, or transmission to devices other than the determination device 40.

<Respective Access Information Databases>

Next, description will be given of an example of a data structure of the facility-side access information database 421 and the vehicle-side access information database 422 with reference to FIG. 6A and FIG. 6B.

As shown in FIG. 6A, in the facility-side access information database 421, each access to the facility device 10 by the terminal 30 is set as one record. In addition, information in each record is accommodated in a field of a corresponding column. Examples of columns which constitute the facility-side access information database 421 include "facility device identification information", "terminal identification information", "access initiation time", and "access termination time".

Specific content of information that is accommodated in each of the columns will be described. The "facility device identification information" is information for identifying the facility device 10 that is a transmission source of the facility-side access information. The access information accumulation unit 411 stores the facility device identification information included in the facility-side access information in a field.

The "terminal identification information" is information for identifying the terminal 30 that accesses the facility device 10 that is a transmission source of the facility-side access information for communication. The access information accumulation unit 411 stores the terminal identification information included in the facility-side access information in a field.

The "access initiation time" is a time at which the terminal 30 initiates communication access to the facility device 10 that is the transmission source of the facility-side access information. In addition, the "access termination time" is a time at which the terminal 30 terminates the communication access to the facility device 10 that is the transmission source of the facility-side access information. The access information accumulation unit 411 stores the access initiation time and the access termination time which are included in the facility-side access information in fields.

Pieces of the information which are accommodated in the columns are included in the facility-side access information that is transmitted from the facility device 10. That is, the facility-side access information transmission unit 112 of the facility device 10 generates the facility-side access information to include the pieces of information, and transmits the generated facility-side access information to the determination device 40. The access information accumulation unit 411 stores the facility-side access information received by the communication unit 43 in a corresponding information attribute field to construct and update the facility-side access information database 421.

As shown in FIG. 6B, in the vehicle-side access information database 422, each access to the in-vehicle device 20 by the terminal 30 is set as one record. In addition, information in each record is accommodated in a field of a corresponding column. Examples of columns which constitute the vehicle-side access information database 422 include "in-vehicle device identification information", "terminal identification information", "access initiation time", "access termination time", and "visit facility identification information".

Specific content of information that is accommodated in each of the columns will be described. The "in-vehicle device identification information" is information for identifying the in-vehicle device 20 that is a transmission source of the vehicle-side access information. The access information accumulation unit 411 stores the in-vehicle device identification information included in the vehicle-side access information in a field.

The "terminal identification information" is information for identifying the terminal 30 that accesses the in-vehicle device 20 that is the transmission source of the vehicle-side access information for communication. The access information accumulation unit 411 stores the terminal identification information included in the vehicle-side access information in a field.

The "access initiation time" is a time at which the terminal 30 initiates communication access to the in-vehicle device 20 that is the transmission source of the vehicle-side access information. In addition, the "access termination time" is a time at which the terminal 30 terminates the communication access to the in-vehicle device 20 that is the transmission source of the vehicle-side access information. The access information accumulation unit 411 stores the access initiation time and the access termination time which are included in the vehicle-side access information in fields.

The "visit facility identification information" is information for identifying a facility that a user visits with the vehicle 2 on which the in-vehicle device 20 that is a transmission source is mounted. The access information accumulation unit 411 stores the facility identification information of the visit facility, which is included in the vehicle-side access information, in a field.

Pieces of the information which are accommodated in the columns are included in the vehicle-side access information that is transmitted from the in-vehicle device 20. That is, the vehicle-side access information transmission unit 212 of the in-vehicle device 20 generates the vehicle-side access information to include the pieces of information, and transmits the generated vehicle-side access information to the determination device 40. The access information accumulation unit 411 stores the vehicle-side access information received by the communication unit 43 in a corresponding information attribute field to construct and update the vehicle-side access information database 422.

<Determination by Occupant Determination Unit 412>

Next, determination by the occupant determination unit 412 by using the databases will be described. The occupant determination unit 412 compares the facility-side access information accumulated in the facility-side access information database 421 and the vehicle-side access information accumulated in the vehicle-side access information database 422 in access information determination processing to determine whether or not the terminals 30 of occupants who get on the vehicle 2 (that is, the occupants who use the terminals 30) have a predetermined correlation.

Accordingly, the occupant determination unit 412 associates terminals 30 which access the same facility device 10 as terminals 30 having a predetermined correlation with reference to respective records of the facility-side access information database 421. This is based on the following consideration. That is, access to the same facility device 10 represents that users of the terminals 30 use the terminals 30 in the same facility 1, and thus the users have a predetermined correlation. In this embodiment, a house in which a family resides is assumed as the facility 1, and thus the terminals 30 which are associated with each other can be estimated as terminals 30 which are used by members of the family in the house.

Next, the occupant determination unit 412 specifies terminals 30 which access the same in-vehicle device 20 at the same time zone as terminals 30 of users who get on the same vehicle 2 with reference to the respective records of the vehicle-side access information database 422. In addition, the occupant determination unit 412 determines whether or not a combination of the specified terminals 30 of the users who get on the same vehicle 2 matches a combination of the terminals 30 which are associated as the terminals 30 having a predetermined correlation.

Here, in a case of matching, it is determined that the terminals 30 (users thereof) in the same vehicle 2 have a predetermined correlation. In this embodiment, the house in which the family resides is assumed as the facility 1, and thus it is possible to estimate that the family gets on the same vehicle 2. In this case, in a case of total matching, all occupants can be estimated as the family. In addition, in a case of partial matching, partial occupants can be estimated as the family. On the other hand, in a case of non-matching, it is determined that the terminals 30 (users thereof) on the same vehicle 2 do not have a predetermined correlation. That is, it is possible to estimate that all occupants are not family.

In this manner, the occupant determination unit 412 can perform determination as to whether or not the terminals 30 (users thereof) in the same vehicle 2 have a predetermined correlation. In addition, it is possible to determine the number of occupants from the number of the terminals 30 in the same vehicle 2. In addition, the occupant determination unit 412 can specify a visit facility on the basis of the visit facility identification information of the vehicle-side access information database 422 in the determination, and can correlate the specified visit facility and the determination result. According to this, it is possible to obtain a determination result indicating that a vehicle 2 which visits each facility is a vehicle 2 on which users estimated as a family get, or a vehicle 2 on which users who are not estimated as a family get.

<Operation of This Embodiment>

Next, an operation of this embodiment will be described with reference to flowcharts of FIG. 7 and FIG. 8. Here, FIG. 7 is a flowchart illustrating an operation in the access information collection processing. On the other hand, FIG. 8 is a flowchart illustrating an operation in the access information determination processing.

First, the operation in the access information collection processing related to the facility device 10 will be described with reference to FIG. 7. In step S11, the facility-side access information transmission unit 112 determines whether or not to initiate transmission of the facility-side access information. For example, in a case where any one terminal 30 accesses the facility device 10 for communication, transmission of the facility-side access information is initiated. In a case where any one terminal 30 accesses the facility device 10 for communication, in step S11, it is determined as Yes, and the processing proceeds to step S12. On the other hand, in a case where any terminal 30 does not access the facility device 10 for communication, in step S11, it is determined as No, and determination in step S11 is repeated.

In step S12, the facility-side access information transmission unit 112 acquires terminal identification information of the terminal 30 that accesses the facility device 10 for communication. In step S13, the facility-side access information transmission unit 112 generates facility-side access information on the basis of the terminal identification information acquired in step S12 and the like, and transmits the generated facility-side access information to the determination device 40.

In step S14, the facility-side access information transmission unit 112 determines whether or not to terminate transmission of the facility-side access information. For example, in a case where the facility-side access information transmission unit 112 transmits the facility-side access information including an access termination time after the terminal 30 terminates the communication access to the facility device 10, transmission of the facility-side access information is terminated. In a case where the facility-side access information including the access termination time is transmitted, in step S14, it is determined as Yes, and the processing proceeds to step S15. On the other hand, in a case where the communication access of the terminal 30 continues still, and the facility-side access information including the access termination time is not transmitted, in step S14, it is determined as No, and the processing from step S12 is repeated again.

In step S15, the access information accumulation unit 411 of the determination device 40 accumulates the acquired facility-side access information in the facility-side access information database 421 to update the facility-side access information database 421. Through the above-described access information collection processing, the facility-side access information database 421 is updated with the facility-side access information.

Next, an operation in access information collection processing related to the in-vehicle device 20 will be described. With regard to description of the operation in the access information collection processing related to the in-vehicle device 20, in the description that is made with reference to FIG. 7, the facility device 10 may be switched to the in-vehicle device 20, the facility-side access information transmission unit 112 may be switched to the vehicle-side access information transmission unit 212, the facility-side access information may be switched to the vehicle-side access information, and the facility-side access information database 421 may be switched to the vehicle-side access information database 422. Accordingly, redundant description will be omitted.

Next, the operation in the access information determination processing will be described with reference to the flowchart of FIG. 8. In step S21, the occupant determination unit 412 determines whether or not the facility-side access information database 421 or the vehicle-side access information database 422 is updated by the access information accumulation unit 411. In a case where any one database is updated, in step S21, it is determined as Yes, and the processing proceeds to step S22. On the other hand, in a case where any database is not updated, in step S21, it is determined as No, and the determination in step S21 is repeated.

In step S22, the occupant determination unit 412 acquires the facility-side access information from the facility-side access information database 421. In step S23, the occupant determination unit 412 acquires the vehicle-side access information from the vehicle-side access information database 422. Furthermore, for convenience of description in the flowchart, it is described that the occupant determination unit 412 performs step S23 after performing step S22, but occupant determination unit 412 may perform step S22 after performing step S23, or may perform step S22 and step S23 in parallel.

In step S24, the occupant determination unit 412 compares the facility-side access information acquired in step S22 and the vehicle-side access information acquired in step S23 with each other to perform determination. In step S25, the determination result output unit 413 outputs a determination result in step S24.

Through the above-described access information determination processing, a determination result as to whether or not the terminals 30 of respective occupants who get on the vehicle 2 (that is, the occupants who use the terminals 30) have a predetermined correlation is output. That is, a determination result described in the column of <Determination by Occupant Determination Unit 412> is output. That is, according to this embodiment, it is possible to perform determination related to occupants of a moving body in more detail.

In addition, a user of the determination device 40 can utilize a determination result by the determination device 40 in various uses. For example, the user of the determination device 40 can use a determination result that is obtained by the determination device 40 and relates to the number of occupants or the attribute of the occupants in a marketing consulting service that is performed with respect to commercial facilities such as a restaurant and a museum.

For example, as described above, a determination result is set to be correlated with a visit facility, and thus it is possible to analyze how many users with which attribute visit which facility. In addition, it is possible to analyze a facility visit time zone on the basis of an access termination time and the like. In addition, in this embodiment, it is possible to perform determination on the basis of access information without necessity for member registration on a predetermined site by a user who uses the terminal 30. That is, in this embodiment, it is possible to perform determination without labor of the user.

MODIFICATION EXAMPLE

The above-described embodiment is a preferred embodiment of the invention. However, the scope of the invention is not limited to the above-described embodiment, and various modifications can be made in a range not departing from the gist of the invention.

First Modification Example

In the above-described embodiment, the occupant determination unit 412 makes a determination as to whether or not a combination of terminals 30 of users who get on the same vehicle 2 which are specified on the basis of the vehicle-side access information matches a combination of terminals 30 which are associated as terminals 30 having a predetermined correlation and are specified on the basis of the facility-side access information.

In the determination, determination may be performed in consideration of the number of times of access to the same facility device 10 or an accumulated time. For example, terminals 30 of which the number of times of access to the same facility device 10 is great may be considered to have a high correlation. That is, it is possible to estimate users of the terminals 30 of which the number of times of access is great as a family. Similarly, terminals 30 of which an accumulated time of access to the same facility device 10 is long may be considered to have a high correlation. That is, it is possible to estimate users of the terminals 30 of which the accumulated time of access is long as a family.

Here, the occupant determination unit 412 may determine the degree of the correlation on the basis of the number of times of access or the accumulated time, and may include the degree in the determination result. In addition, the occupant determination unit 412 may perform the determination as the terminals 30 having a correlation only in a case where the degree of the correlation is high.

Second Modification Example

As in the first modification example, the occupant determination unit 412 may modify the determination method. For example, the occupant determination unit 412 analyzes a time or a time zone at which respective terminals 30 access the facility device 10 for communication on the basis of the access initiation time and the access termination time which are included in the facility-side access information. In addition, users of the terminals 30 and the like are estimated on the basis of the analysis result. For example, in a case where the facility 1 is a retail shop or a restaurant, a user of a terminal 30 that performs communication access within a business time zone in which accepting of a customer is performed can be estimated as a customer. On the other hand, a user of a terminal 30 that performs communication access before or after the business time zone in which accepting of a customer is performed can be estimated as an employee who performs shop operation preparation and the like.

Third Modification Example

In the above-described embodiment, the facility-side access information transmission unit 112 or the vehicle-side access information transmission unit 212 generates access information with respect to each communication access of each of the terminals 30, and transmits the access information to the determination device 40. This configuration may be modified as follows. Specifically, the access information may be generated with respect to all of the terminals 30 which simultaneously perform communication access at the same time and may transmit the access information to the determination device 40. For example, a list of all pieces of terminal identification information of the terminals 30 which simultaneously perform communication access at the same time may be transmitted to the determination device 40 in a state of being included in the access information.

Fourth Modification Example

In the above-described embodiment, it is assumed that the facility device 10 is realized by a general-purpose relay device such as a router. For example, the facility device 10 may be realized by a predetermined terminal 30 that has a tethering function and operates as a relay device without limitation to the general-purpose relay device. In this case, the predetermined terminal 30 acquires the terminal identification information from other terminals 30 which access the communication network 50 for communication in a state in which the predetermined terminal is set as a relay device. In addition, the predetermined terminal 30 generates the facility-side access information on the basis of the acquired terminal identification information and the like. In addition, the predetermined terminal 30 transmits the generated facility-side access information to the determination device 40. According to this, the same processing as in the embodiment can be realized. This modification example is based on a consideration that users of other terminals 30 which access the communication network 50 for communication through the predetermined terminal 30 that has the tethering function as the relay device are estimated as users (for example, a family) having a predetermined correlation with a user of the terminal 30 having the tethering function.

Fifth Modification Example

In the above-described embodiment, the facility device 10 acquires terminal identification information of the terminals 30 from the terminals 30 which access the facility device 10 for communication, and generates the facility-side access information. The facility device 10 may acquire the terminal identification information of still another terminal 30, and may generate the facility-side access information without limitation to the above-described configuration. In this case, as in the fourth modification example, the predetermined terminal 30 that has the tethering function and functions as the relay device is used. In this modification example, the predetermined terminal 30 acquires the terminal identification information from other terminals 30 which access the communication network 50 for communication in a state in which the predetermined terminal is set as the relay device. In addition, the predetermined terminal 30 stores the terminal identification information that is acquired from the other terminals 30. In addition, in a case where the predetermined terminal 30 accesses the facility device 10 for communication, the facility device 10 acquires, from the predetermined terminal 30, both terminal identification information of the predetermined terminal 30 itself and the terminal identification information that is stored in the predetermined terminal 30 and has been acquired from the other terminals 30. In addition, the facility device 10 generates the facility-side access information on the basis of the acquired terminal identification information and the like, and transmits the generated facility-side access information to the determination device 40. According to this, it is possible to acquire more pieces of terminal identification information to generate the facility-side access information. As in the fourth modification example, this modification example is also based on a consideration that users of other terminals 30 which access the communication network 50 for communication in a state in which the predetermined terminal 30 that has the tethering function and functions as the relay device are estimated as users (for example, a family) having a predetermined correlation with a user of the terminal 30 having the tethering function.

Sixth Modification Example

The functional configuration of the above-described embodiment may be modified. That is, the functional configurations illustrated in FIG. 2, FIG. 3, FIG. 4, and FIG. 5 are illustrative only, and do not limit the functional configurations of this embodiment. That is, the respective devices may be provided with functions capable of executing a series of processing related to the information determination function of the invention as a whole, and use of any functional block for realization of the function is not limited to the examples in FIG. 2, FIG. 3, FIG. 4, and FIG. 5.

In addition, with regard to devices for realizing the functional configurations, description of the embodiment is illustrative only. For example, in the embodiment, description has been given of an example in which the determination device 40 is realized by one piece of server device or the like, but a distribution processing system in which respective functions of the determination device 40 are appropriately distributed to a plurality of server devices may be employed. In addition, the respective functions of the determination device 40 may be realized by using a virtual server function and the like on the cloud.

In addition, for example, a function of relaying communication by the in-vehicle device 20 may be omitted, and the terminal identification information may be acquired in a case where the terminals 30 and the in-vehicle device 20 directly perform communication. In addition, the display unit 44 and the input unit 45 which are provided in the determination device 40 may be realized by a device separated from a device which realizes other units of the determination device 40. For example, a device that realizes the control unit 41, the storage unit 42, and the communication unit 43 and a device that realizes the display unit 44 and the input unit 45 may be separated devices, and both the devices may perform communication through the communication network 50.

<With Regard to Hardware and Software>

Furthermore, each of the respective devices included in the navigation system can be realized by hardware, software, or a combination thereof. In addition, a navigation method in which the respective devices included in the navigation system cooperate can also be realized by hardware, software, or a combination thereof. Here, realization by software represents realization through scanning and execution of a program by a computer.

The program can be accommodated by using various types of non-transitory computer-readable media, and can be supplied to a computer. The non-transitory computer-readable medium includes various types of tangible storage media. Examples of the non-transitory computer-readable medium include a magnetic recording medium (for example, a flexible disk, a magnetic tape, and a hard disk drive), an magneto-optical recording medium (for example, an magneto-optical disc), a read only memory (CD-ROM), a CD-R, a CD-RW, and a semiconductor memory (for example, a mask ROM, a programmable ROM (PROM), an erasable PROM (EPROM), a flash ROM, and a random access memory (RAM)). In addition, the program may be supplied to the computer with various types of transitory computer-readable media. Examples of the transitory computer-readable media include electric signals, optical signals, and electromagnetic waves. The transitory computer-readable media can supply the program to the computer through a wired communication path such as an electric wire and an optical fiber, or a wireless communication path.

EXPLANATION OF REFERENCE NUMERALS

S GETTING-ON ATTRIBUTE DETERMINATION SYSTEM
1 FACILITY
2 VEHICLE
10 FACILITY DEVICE
20 IN-VEHICLE DEVICE
30 TERMINAL
40 DETERMINATION DEVICE
50 COMMUNICATION NETWORK
11, 21, 31, 41 CONTROL UNIT
111 FACILITY-SIDE RELAY UNIT
112 FACILITY-SIDE ACCESS INFORMATION TRANSMISSION UNIT
211 VEHICLE-SIDE RELAY UNIT
212 VEHICLE-SIDE ACCESS INFORMATION TRANSMISSION UNIT
213 ROUTE GUIDANCE UNIT
311 PREDETERMINED FUNCTION EXECUTION UNIT
411 ACCESS INFORMATION ACCUMULATION UNIT
412 OCCUPANT DETERMINATION UNIT
413 DETERMINATION RESULT OUTPUT UNIT
12, 22, 32, 42 STORAGE UNIT
121, 221 COMMUNICATION SETTING INFORMATION
122 FACILITY DEVICE IDENTIFICATION INFORMATION
222 IN-VEHICLE DEVICE IDENTIFICATION INFORMATION
223 MAP INFORMATION
321 TERMINAL IDENTIFICATION INFORMATION
421 FACILITY-SIDE ACCESS INFORMATION DATABASE
422 VEHICLE-SIDE ACCESS INFORMATION DATABASE
13, 23, 33, 43 COMMUNICATION UNIT
14, 24, 34, 44 DISPLAY UNIT
15, 25, 35, 45 INPUT UNIT
26 SENSOR UNIT

What is claimed is:

1. A determination device comprising:
a first radio, associated with a stationary facility, that communicates with a plurality of facility-side terminals present at the stationary facility and acquires facility-side access information that includes specific information from each facility-side terminal of the plurality of facility-side terminals that communicate with the first radio;
a second radio, associated with a moving-body, that communicates with a plurality of moving-body side terminals present at the moving body and acquires moving body-side access information that includes specific information from each moving-body side terminal of the plurality of moving-body side terminals that communicate with the second radio;
a database that stores the specific information from each facility-side terminal as facility-side access information and stores the specific information from each moving-body side terminal as moving-body side access information; and
a processor that:
accesses the facility-side access information and the moving-body side access information stored in the database,
makes a comparison of the specific information included in the facility-side access information and the specific information included in the moving body-side access information,
determines a set of correlated terminals from the plurality of facility-side terminals and the plurality of moving-body side terminals that have a predetermined correlation based on the comparison, and
output a determination result of the set of correlated terminals to a display,
wherein the stationary facility is a house in which a family resides, the processor determines that the set of correlated terminals from the plurality of facility-side terminals and the plurality of moving-body side terminals are associated with members of the family that resides at the stationary facility.

2. The determination device according to claim 1, wherein the predetermined correlation is based on the specific information included in the facility-side access information from one or more facility-side terminals of the plurality of facility-side terminals being the same as the specific information included in the moving body-side access information from one or more moving-body side terminals of the plurality of moving-body side terminals.

3. The determination device according to claim 1, wherein the facility-side access information includes a count of a number of times that each facility-side terminal communicated with the first radio and the predetermined correlation is based on the count of the number of times that each facility-side terminal communicated with the first radio.

4. The determination device according to claim 1, wherein the facility-side access information includes an accumulated length of time that each facility-side terminal communicated with the first radio and the predetermined correlation is based on the accumulated length of time that each facility-side terminal communicated with the first radio.

5. The determination device according to claim 1, wherein the facility-side access information includes an access time that each facility-side terminal communicated with the first radio and the predetermined correlation is based on the access time that each facility-side terminal communicated with the first radio.

6. A determination system comprising:
a facility network associated with a stationary facility including a first radio that communicates with a plurality of facility-side terminals present at the stationary facility and acquires facility-side access information that includes specific information from each facility-side terminal of the plurality of facility-side terminals that communicate with the first radio;
a moving-body network associated with a moving-body including a second radio that communicates with a plurality of moving-body side terminals present at the moving body and acquires moving body-side access information that includes specific information from each moving-body side terminal of the plurality of moving-body side terminals that communicate with the second radio;
a database that stores the specific information from each facility-side terminal as facility-side access information and stores the specific information from each moving-body side terminal as moving-body side access information; and
a determination processor that:
  accesses the facility-side access information and the moving-body side access information stored in the database,
  makes a comparison of the specific information included in the facility-side access information and the specific information included in the moving body-side access information,
  determines a set of correlated terminals from the plurality of facility-side terminals and the plurality of moving-body side terminals that have a predetermined correlation based on the comparison, and
  output a determination result of the set of correlated terminals to a display, wherein
the facility network further includes a facility processor that:
  relays communication from each facility-side terminal of the plurality of facility-side terminals, and
  generates the facility-side access information on the basis of the specific information from each facility-side terminal of the plurality of facility-side terminals which is acquired during the relaying, and
  transmits the generated facility-side access information to the determination processor,
wherein the stationary facility is a house in which a family resides, the processor determines that the set of correlated terminals from the plurality of facility-side terminals and the plurality of moving-body side terminals are associated with members of the family that resides at the stationary facility.

7. A determination method that is performed by a computer, the method comprising:
acquiring facility-side access information that includes specific information of each facility-side terminal of a plurality of facility-side terminals that accesses a network in a stationary facility;
acquiring moving body-side access information that includes specific information of each moving-body side terminal of a plurality of moving-body side terminals that accesses a network in a moving body; and
comparing the specific information included in the facility-side access information and the specific information included in the moving body-side access information;
determining a set of correlated terminals from the plurality of facility-side terminals and the plurality of moving-body side terminals that have a predetermined correlation based on the comparing, and
outputting a determination result of the set of correlated terminals to a display,
wherein the stationary facility is a house in which a family resides, the processor determines that the set of correlated terminals from the plurality of facility-side terminals and the plurality of moving-body side terminals are associated with members of the family that resides at the stationary facility.

* * * * *